US012005636B2

(12) United States Patent
Yamada et al.

(10) Patent No.: US 12,005,636 B2
(45) Date of Patent: Jun. 11, 2024

(54) ADDITIVE MANUFACTURING DEVICE AND ADDITIVE MANUFACTURING METHOD

(71) Applicant: IHI Corporation, Tokyo (JP)

(72) Inventors: Masato Yamada, Tokyo (JP); Masashi Mouri, Tokyo (JP); Yuki Kozue, Tokyo (JP)

(73) Assignee: IHI Corporation, Tokyo (JP)

( * ) Notice: Subject to any disclaimer, the term of this patent is extended or adjusted under 35 U.S.C. 154(b) by 496 days.

(21) Appl. No.: 16/759,526

(22) PCT Filed: Oct. 30, 2018

(86) PCT No.: PCT/JP2018/040304
§ 371 (c)(1),
(2) Date: Apr. 27, 2020

(87) PCT Pub. No.: WO2019/088091
PCT Pub. Date: May 9, 2019

(65) Prior Publication Data
US 2020/0269345 A1    Aug. 27, 2020

(30) Foreign Application Priority Data
Oct. 31, 2017    (JP) ................................. 2017-210959

(51) Int. Cl.
*B29C 64/153*    (2017.01)
*B22F 10/28*    (2021.01)
(Continued)

(52) U.S. Cl.
CPC ............ *B29C 64/153* (2017.08); *B22F 10/28* (2021.01); *B22F 10/37* (2021.01); *B22F 10/38* (2021.01);
(Continued)

(58) Field of Classification Search
CPC . B23K 15/0086; B23K 15/0033; B22F 10/20; B22F 10/85; B22F 12/17;
(Continued)

(56) References Cited

U.S. PATENT DOCUMENTS

2006/0054039 A1\* 3/2006 Kritchman .............. B29C 48/92
427/256
2006/0157454 A1 7/2006 Larsson
(Continued)

FOREIGN PATENT DOCUMENTS

| CN | 105478766 A | 4/2016 |
|----|-------------|--------|
| CN | 105689715 A | 6/2016 |

(Continued)

OTHER PUBLICATIONS

Chiba, Akihiko, "Microstructure of Alloys Fabricated by Additive Manufacturing Using Electron Beam Melting", Journal of the Society of Instrument and Control Engineers, vol. 54, No. 6, p. 399-p. 404 (with English concise explanation of relevance for Part 4.—Interaction between Electron Beam and Metal Powder) (Jun. 2015).

(Continued)

*Primary Examiner* — John A Hevey
(74) *Attorney, Agent, or Firm* — Volpe Koenig

(57) ABSTRACT

An additive manufacturing device performs manufacturing of an additively manufactured article by supplying a powder material to an irradiation region of an electron beam, laying and leveling the powder material, irradiating the powder material with the electron beam, and melting the powder material. The additive manufacturing device determines whether or not the powder material has scattered during manufacturing of the article. When it is determined that the powder material has scattered, an irradiation region R is heated by a heater before a new powder material is supplied (Continued)

to the irradiation region R. Manufacturing of the article is restarted after the new powder material has been supplied to the heated irradiation region.

3 Claims, 10 Drawing Sheets

(51) Int. Cl.
| | |
|---|---|
| *B22F 10/37* | (2021.01) |
| *B22F 10/38* | (2021.01) |
| *B22F 10/85* | (2021.01) |
| *B22F 12/13* | (2021.01) |
| *B22F 12/17* | (2021.01) |
| *B22F 12/40* | (2021.01) |
| *B22F 12/90* | (2021.01) |
| *B23K 15/00* | (2006.01) |
| *B33Y 10/00* | (2015.01) |
| *B33Y 30/00* | (2015.01) |

(52) U.S. Cl.
CPC .............. *B22F 10/85* (2021.01); *B22F 12/13* (2021.01); *B22F 12/17* (2021.01); *B22F 12/40* (2021.01); *B22F 12/90* (2021.01); *B23K 15/0033* (2013.01); *B23K 15/0086* (2013.01); *B33Y 10/00* (2014.12); *B33Y 30/00* (2014.12)

(58) Field of Classification Search
CPC .......... B22F 12/40; B22F 12/90; B22F 10/28; B22F 10/36; B22F 10/64; B22F 12/13; B22F 12/44; B22F 12/49; B22F 12/52; B22F 12/60; B22F 2999/00; B33Y 10/00; B33Y 30/00; B33Y 50/00; B33Y 50/02; Y02P 10/25; B29C 64/393; B29C 64/153
See application file for complete search history.

(56) References Cited

U.S. PATENT DOCUMENTS

| | | | |
|---|---|---|---|
| 2006/0157892 | A1 | 7/2006 | Larsson |
| 2010/0270708 | A1* | 10/2010 | Jonasson ............... B29C 64/153 |
| | | | 264/401 |
| 2010/0305743 | A1 | 12/2010 | Larsson |
| 2012/0126457 | A1 | 5/2012 | Abe et al. |
| 2015/0151490 | A1 | 6/2015 | Jonasson et al. |
| 2017/0120370 | A1* | 5/2017 | Ahn ....................... B33Y 10/00 |
| 2017/0274599 | A1 | 9/2017 | Kitamura et al. |
| 2017/0282244 | A1 | 10/2017 | Mizuno et al. |
| 2018/0169938 | A1* | 6/2018 | Inenaga ................. B33Y 30/00 |

FOREIGN PATENT DOCUMENTS

| | | | |
|---|---|---|---|
| CN | 106956008 | A | 7/2017 |
| CN | 107262712 | A | 10/2017 |
| JP | 2010-261072 | A | 11/2010 |
| JP | 2010-265521 | A | 11/2010 |
| JP | 4639087 | B2 | 2/2011 |
| JP | 2011-052289 | A | 3/2011 |
| JP | 5008260 | B2 | 8/2012 |
| JP | 5095917 | B2 | 12/2012 |
| JP | 6154544 | B1 | 6/2017 |
| JP | 2017-160482 | A | 9/2017 |
| WO | 2016/042810 | A1 | 3/2016 |

OTHER PUBLICATIONS

Chiba, Akihiko, "Additive Manufacturing Using Electron Beam Melting (EBM) Technique and EBM Metallurgy", Journal of Smart Processing, vol. 3, No. 3, p. 152-p. 157 (with English concise explanation of relevance for Part d.—Preheating) (May 2014).
Chad A. Steed et al., "Falcon: Visual analysis of large, irregularly sampled, and multivariate time series data in additive manufacturing", Computers & Graphics, Feb. 16, 2017, p. 50-p. 64.

* cited by examiner

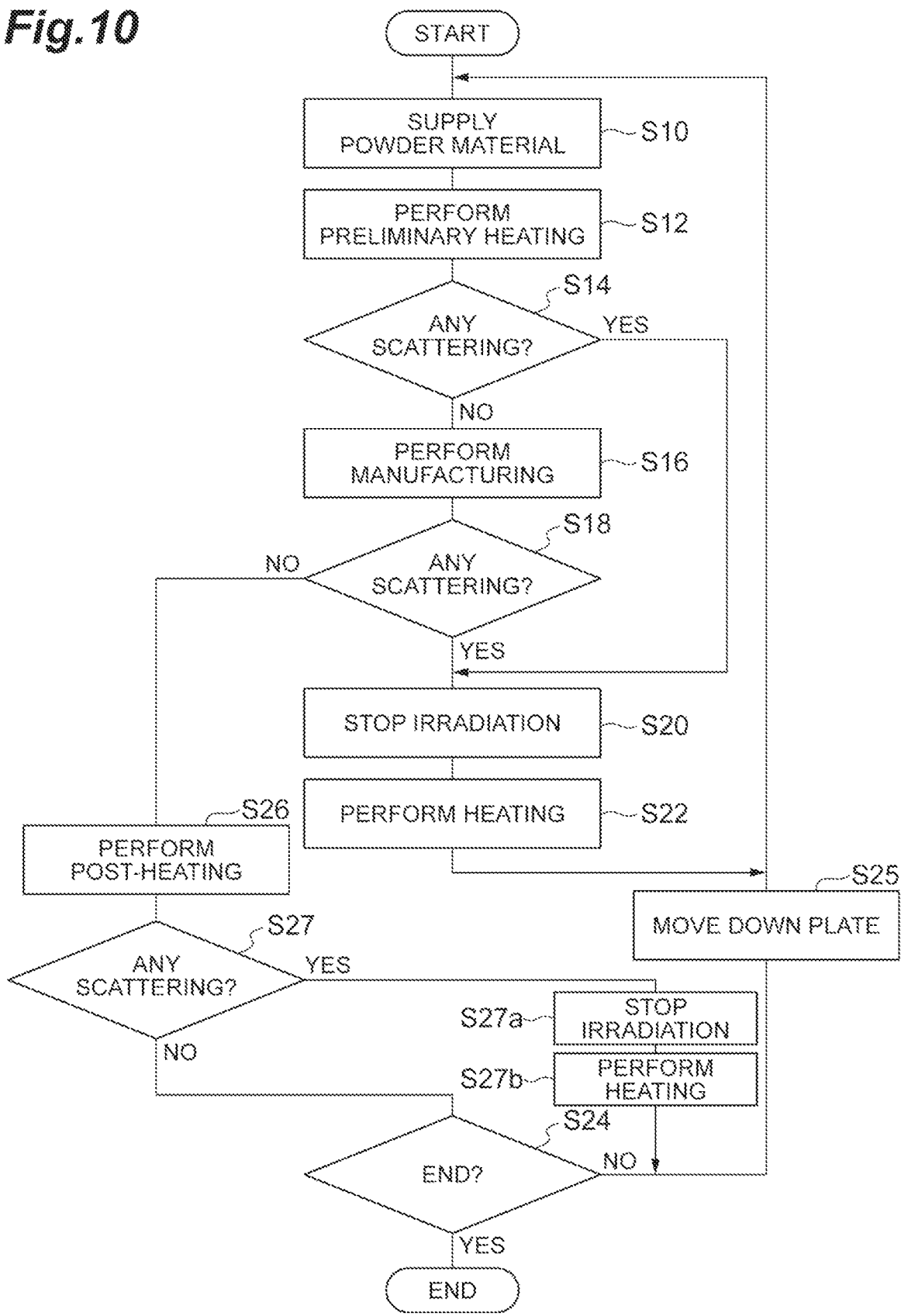

ADDITIVE MANUFACTURING DEVICE AND ADDITIVE MANUFACTURING METHOD

TECHNICAL FIELD

The present disclosure describes an additive manufacturing device and an additive manufacturing method for manufacturing an additively manufactured article.

BACKGROUND ART

Japanese Patent No. 6154544 discloses an additive manufacturing device and an additive manufacturing method. In the additive manufacturing device and the additive manufacturing method described in Japanese Patent No. 6154544, a powder material is melted by irradiating the powder material with an electron beam, and the melted powder material is solidified thereafter. In the device and the method, in order to solidify a powder material after it is melted, preliminary heating of the powder material is performed before irradiation is performed with an electron beam using a heater which is installed in a side portion or an upper portion of a manufacturing box. As a result, there is no need to perform preliminary heating of irradiation with an electron beam. Therefore, a speed of manufacturing an article can be increased.

CITATION LIST

Patent Literature

Patent Literature 1: Japanese Patent No. 6154544

SUMMARY OF INVENTION

Technical Problem

In the device and the method for additive manufacturing described above, when scattering of a powder material occurs during irradiation with an electron beam, work is halted. As a result, manufacturing of an article cannot proceed smoothly. Scattering of a powder material is a phenomenon in which a powder material is blown upward in a mist state, and which is also referred to as smoke. When scattering of a powder material occurs, irradiation with an electron beam is restarted after a powder material is supplied to an irradiation region of the electron beam. However, if beam irradiation is performed in the same heating circumstances, there is concern that a powder material may scatter again. Therefore, manufacturing of an article cannot be performed smoothly.

Here, it is desired to develop an additive manufacturing device and an additive manufacturing method capable of smoothly manufacturing an article by curbing scattering of a powder material.

Solution to Problem

According to an aspect of the present disclosure, there is provided an additive manufacturing device performing manufacturing of an additively manufactured article by supplying a powder material to an irradiation region of a charged particle beam, laying and leveling the powder material, irradiating the powder material with the charged particle beam, and melting the powder material. The additive manufacturing device includes a beam emitting unit emitting the charged particle beam and irradiating the powder material with the charged particle beam, a detection unit detecting that the powder material has scattered by irradiating the powder material with the charged particle beam, and a heating unit heating the irradiation region. When scattering of the powder material is detected by the detection unit during manufacturing of the article, the heating unit heats the irradiation region before a new powder material is supplied to the irradiation region. When scattering of the powder material is detected by the detection unit during manufacturing of the article, the beam emitting unit stops irradiation with the charged particle beam and restarts irradiation with the charged particle beam after the new powder material has been supplied to the heated irradiation region.

Effects of Invention

According to the additive manufacturing device of the present disclosure, occurrence of scattering of a powder material is curbed. Therefore, manufacturing of an article can be performed smoothly.

BRIEF DESCRIPTION OF DRAWINGS

FIG. 10 is a flowchart showing another modification example of the additive manufacturing method of the present disclosure.

DESCRIPTION OF EMBODIMENT

Figure 1:
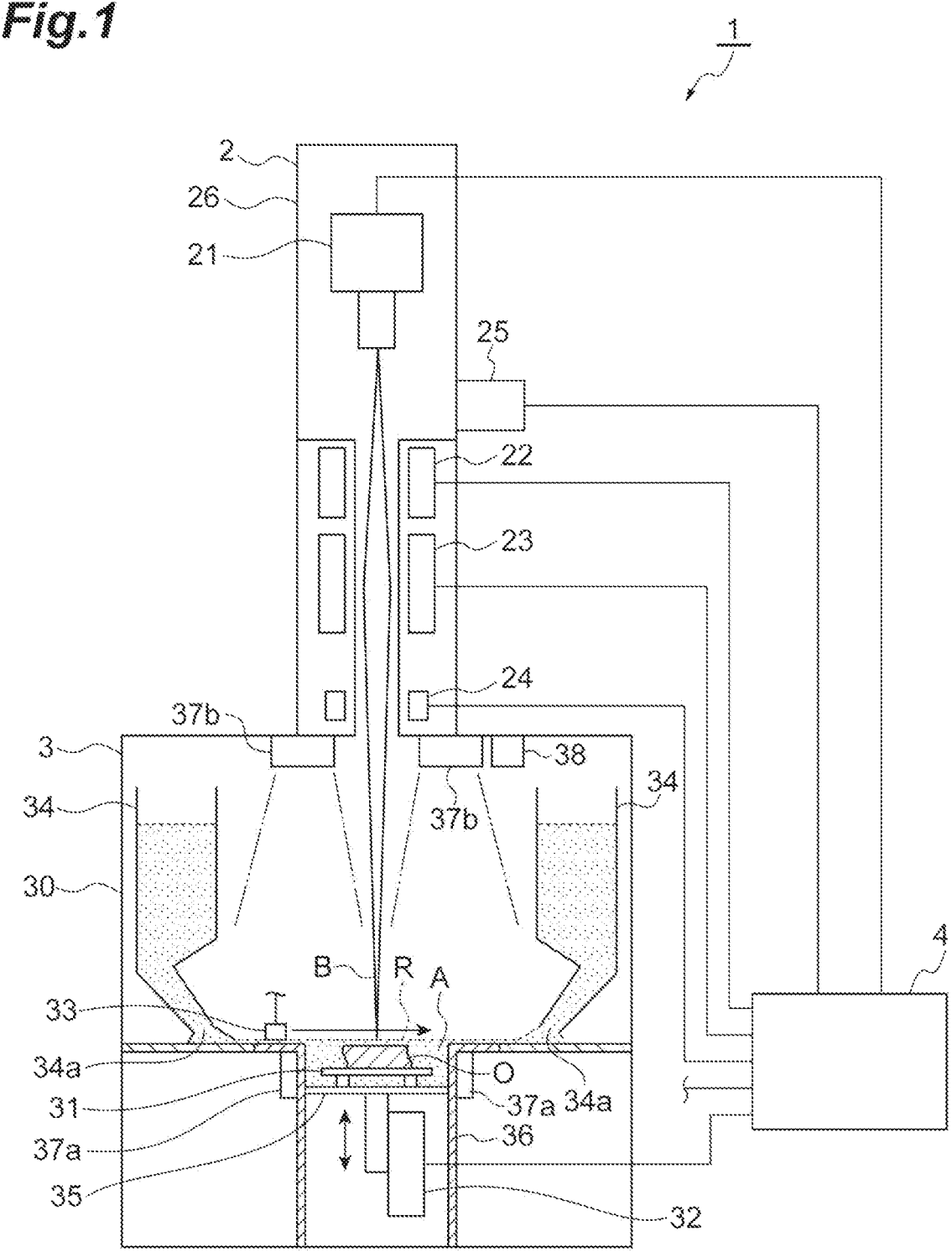
FIG. 1 is a schematic view illustrating a configuration of an additive manufacturing device of the present disclosure.

According to an aspect of the present disclosure, there is provided an additive manufacturing device performing manufacturing of an additively manufactured article by supplying a powder material to an irradiation region of a charged particle beam, laying and leveling the powder material, irradiating the powder material with the charged particle beam, and melting the powder material. The additive manufacturing device includes a beam emitting unit emitting the charged particle beam and irradiating the powder material with the charged particle beam, a detection unit detecting that the powder material has scattered by irradiating the powder material with the charged particle beam, and a heating unit heating the irradiation region. When occurrence of scattering of the powder material is detected by the detection unit during manufacturing of the article, the heating unit heats the irradiation region before a new powder material is supplied to the irradiation region. When scattering of the powder material is detected by the detection unit during manufacturing of the article, the beam emitting unit stops irradiation with the charged particle beam and restarts irradiation with the charged particle beam after the new powder material has been supplied to the heated irradiation region. In this additive manufacturing device, when the powder material scatters due to irradiation with the charged particle beam, the heating unit heats the irradiation region before the powder material is supplied to the irradiation region. Further, the additive manufacturing device restarts manufacturing of the article after the powder material is supplied to the heated irradiation region. As a result, when a new powder material is supplied to the irradiation region to restart manufacturing, the irradiation region is already in a high-temperature state. Therefore, when a new powder material is heated, heat of the powder material is unlikely to escape. As a result, it is easy for the powder material to be in a high-temperature state. Therefore, the powder material can be heated sufficiently, and repeated scattering of the powder material can be curbed.

In the additive manufacturing device according to the aspect of the present disclosure, the heating unit may be a heater for heating the irradiation region through conduction or radiation of heat. In this case, a heater for heating the irradiation region through conduction or radiation of heat is used as the heating unit. As a result, compared to a case in which the powder material is heated through irradiation with the charged particle beam, a heat effect on the powder material can be reduced.

In the additive manufacturing device according to the aspect of the present disclosure, when scattering of the powder material is detected by the detection unit during manufacturing of the article, the heating unit may start heating of the irradiation region based on a state in which irradiation with the charged particle beam has stopped. In this case, heating of the irradiation region is started based on the state in which irradiation with the charged particle beam has stopped. As a result, excessive heating of the irradiation region is curbed. Therefore, an influence of heating on the powder material can be reduced. The irradiation region is heated after irradiation with the charged particle beam has stopped. As a result, heating is not performed by the heater during irradiation with the charged particle beam. Therefore, a trajectory of the charged particle beam can be prevented from deviating due to operation of the heater.

According to another aspect of the present disclosure, there is provided an additive manufacturing method for performing manufacturing of an additively manufactured article by supplying a powder material to an irradiation region of a charged particle beam, laying and leveling the powder material, irradiating the powder material with the charged particle beam, and melting the powder material. The additive manufacturing method is configured to include a determination step of determining whether or not the powder material has scattered during manufacturing of the article, a heating step of heating the irradiation region using a heating unit before a new powder material is supplied to the irradiation region when it is determined in the determination step that the powder material has scattered, and a manufacturing step of restarting manufacturing of the article after the new powder material has been supplied to the heated irradiation region in the heating step. According to this additive manufacturing method, when the powder material scatters, the irradiation region is heated before a new powder material is supplied to the irradiation region. Further, the new powder material is supplied to the heated irradiation region. Manufacturing of the article is restarted after the powder material is supplied. As a result, when a new powder material is supplied to the irradiation region to restart manufacturing, the irradiation region is already in a high-temperature state. Therefore, when a new powder material is heated, heat of the powder material is unlikely to escape. As a result, it is easy for the powder material to be in a high-temperature state. Therefore, the powder material can be heated sufficiently, and a recurrence of scattering of the powder material can be curbed.

Hereinafter, an additive manufacturing device and an additive manufacturing method of the present disclosure will be described with reference to the drawings. In description of the drawings, the same reference signs are applied to the same elements, and duplicate description will be omitted.

FIG. 1 is a schematic view illustrating a configuration of the additive manufacturing device of the present disclosure. An additive manufacturing device 1 supplies a powder material A to an irradiation region R of an electron beam B and lays and levels the powder material A thereafter. Further, the additive manufacturing device 1 melts the powder material A by irradiating the powder material A with the electron beam B. The additive manufacturing device 1 manufactures an additively manufactured article O through the foregoing operation.

The electron beam B is a charged particle beam formed due to linear motion of electrons (charged particles). The irradiation region R of the electron beam B is a region which can be irradiated with the electron beam B. In other words, the irradiation region R is a region of a powder bed used for manufacturing the article O.

The additive manufacturing device 1 repeats a step of performing preliminary heating of the powder material A by irradiating the powder material A with the electron beam B, and a step of manufacturing a part of the article O by irradiating the powder material A with the electron beam B in order to melt the powder material A. The additive manufacturing device 1 repeats these steps to perform manufacturing of the article O in which a solidified powder material is laminated. Preliminary heating is also referred to as preheating. In preliminary heating, before the article O is manufactured, the powder material A is heated at a temperature lower than a melting point of the powder material A. As a result of heating the powder material A through preliminary heating, the powder material A is temporarily sintered. When the powder material A is temporarily sintered, accumulation of negative electric charges in the powder material A due to irradiation with the electron beam B is alleviated. Therefore, occurrence of a smoke phenomenon can be curbed. A smoke phenomenon indicates a phenomenon in which the powder material A scatters at the time of irradiation with the electron beam B.

The additive manufacturing device 1 includes a beam emitting unit 2, a manufacturing unit 3, and a control unit 4. The beam emitting unit 2 emits the electron beam B to the powder material A of the manufacturing unit 3 in response to a control signal of the control unit 4. The beam emitting unit 2 irradiates the powder material A with the electron beam B for preliminary heating of the powder material A. Thereafter, the beam emitting unit 2 irradiates the powder material A with the electron beam B for manufacturing the additively manufactured article O. As a result, the powder material A is melted, is then solidified, and therefore article O is manufactured progressively. The beam emitting unit 2 stops irradiation with the electron beam B when scattering of the powder material A is detected during manufacturing of the article O. Next, the powder material A is supplied to the heated irradiation region R. Further, the beam emitting unit 2 restarts irradiation with the electron beam B. Details of a mechanism for detecting scattering of the powder material A will be described below.

The beam emitting unit 2 includes an electron gun portion 21, an aberration coil 22, a focus coil 23, a deflection coil 24, and a scattering detector 25. The electron gun portion 21 is electrically connected to the control unit 4. The electron gun portion 21 operates in response to a control signal from the control unit 4. The electron gun portion 21 emits the electron beam B. For example, the electron gun portion 21 emits the electron beam B downward. The aberration coil 22 is electrically connected to the control unit 4. The aberration coil 22 operates in response to a control signal from the control unit 4. The aberration coil 22 is installed around the electron beam B emitted from the electron gun portion 21. The aberration coil 22 corrects aberration of the electron beam B. The focus coil 23 is electrically connected to the control unit 4. The focus coil 23 operates in response to a control signal from the control unit 4. The focus coil 23 is installed around the electron beam B emitted from the electron gun portion 21. The focus coil 23 causes the electron beam B to converge by performing adjustment such that there is a convergent state at an irradiation position of the electron beam B. The deflection coil 24 is electrically connected to the control unit 4. The deflection coil 24 operates in response to a control signal from the control unit 4. The deflection coil 24 is installed around the electron beam B emitted from the electron gun portion 21. The deflection coil 24 adjusts the irradiation position of the electron beam B in response to a control signal. The deflection coil 24 performs electromagnetic beam deflection. Therefore, a scanning speed of the deflection coil 24 is faster than a scanning speed of mechanical beam deflection. The electron gun portion 21, the aberration coil 22, the focus coil 23, and the deflection coil 24 are installed inside a column 26 exhibiting a tubular shape, for example. Installation of the aberration coil 22 may be omitted.

The scattering detector 25 detects that scattering of the powder material A has occurred due to irradiation of the powder material A with the electron beam B. That is, the scattering detector 25 detects occurrence of a smoke phenomenon when the powder material A is irradiated with the electron beam B. A smoke phenomenon indicates a phenomenon in which the powder material A is blown upward in a mist state due to scattering of the powder material A. For example, the scattering detector 25 is an X-ray detector. The scattering detector 25 is electrically connected to the control unit 4. The scattering detector 25 outputs a detection signal to the control unit 4. The scattering detector 25 detects X-rays generated when smoke is generated. The scattering detector 25 detects that scattering of the powder material A has occurred based on the fact that the number of X-rays detected per unit time exceeds a predetermined threshold. For example, the scattering detector 25 is attached to the column 26. The scattering detector 25 is disposed toward the electron beam B. The scattering detector 25 may be provided at a position in the vicinity of the irradiation region of the powder material A. The scattering detector 25 need only be able to detect scattering of the powder material A, and an instrument, a sensor, or the like other than an X-ray detector may be used.

The manufacturing unit 3 is a part for manufacturing a desired article O. The manufacturing unit 3 accommodates the powder material A inside a chamber 30. The manufacturing unit 3 is provided below the beam emitting unit 2. The manufacturing unit 3 includes the chamber 30 having a box shape. Inside the chamber 30, the manufacturing unit 3 includes a plate 31, an elevator 32, a powder supply mechanism 33, a hopper 34, heaters 37a, heaters 37b, and a temperature detector 38. The chamber 30 is joined to the column 26. An internal space of the chamber 30 communicates with an internal space of the column 26 in which the electron gun portion 21 is disposed.

The plate 31 supports the article O being manufactured. The article O is manufactured progressively on the plate 31. The plate 31 supports the article O being manufactured progressively. An upper surface of the plate 31 and a region above the upper surface is the irradiation region R of the electron beam B. The plate 31 is a plate body. For example, the shape of the plate 31 is a rectangular shape or a circular shape. The plate 31 is disposed on an extended line in an emission direction of the electron beam B. For example, the plate 31 is provided in a horizontal direction. The plate 31 is disposed such that it is supported by an elevating stage 35 installed therebelow. The plate 31 moves in an up-down direction together with the elevating stage 35. The elevator 32 elevates the elevating stage 35 and the plate 31. The elevator 32 is electrically connected to the control unit 4. The elevator 32 operates in response to a control signal from the control unit 4. For example, the elevator 32 moves the plate 31 upward together with the elevating stage 35 in an initial stage of manufacturing of the article O. The elevator 32 moves the plate 31 downward every time the powder material A which has undergone melting and solidifying on the plate 31 is laminated. The elevator 32 need only be a mechanism capable of elevating the plate 31, and any mechanism may be used.

The plate 31 is disposed inside a manufacturing tank 36. The manufacturing tank 36 is installed in a lower portion inside the chamber 30. For example, the shape of the manufacturing tank 36 is a tubular shape. In addition, the cross-sectional shape of the manufacturing tank 36 is a rectangular shape or a circular shape. The manufacturing tank 36 extends in a moving direction of the plate 31. The inner shape of the manufacturing tank 36 follows the outer shape of the elevating stage 35. In order to curb leakage of the powder material A downward from the elevating stage 35, a seal material may be provided between the manufacturing tank 36 and the elevating stage 35.

The powder supply mechanism 33 supplies the powder material A to a part on the plate 31. In addition, the powder supply mechanism 33 levels the surface of the powder material A. The powder supply mechanism 33 functions as a recoater. For example, the powder supply mechanism 33 is a member having a rod shape or a plate shape. The powder supply mechanism 33 moves in the horizontal direction in the irradiation region R, so that the powder material A is supplied to the irradiation region R of the electron beam B and the surface of the powder material A is leveled. The powder supply mechanism 33 moves in accordance with driving of an actuator (not illustrated). The hopper 34 accommodates the powder material A. A discharging port 34a for discharging the powder material A is formed in a lower portion of the hopper 34. The powder material A discharged through the discharging port 34a is supplied to a part on the plate 31 by the powder supply mechanism 33. The plate 31, the elevator 32, the powder supply mechanism 33, and the hopper 34 are installed inside the chamber 30. The inside of the chamber 30 is in a vacuum state or a substantially vacuum state. Mechanisms other than the powder supply mechanism 33 and the hopper 34 may be used as mechanisms for supplying the powder material A to a part on the plate 31.

The powder material A is constituted of a number of powder bodies. For example, a metal powder is used as the powder material A. In addition, the powder material A need only be able to be melted and solidified due to irradiation with the electron beam B, and grains having a larger grain size than a powder may be used.

The heaters 37a are provided on the outer side of the manufacturing tank 36. The heaters 37a function as heating units for heating the irradiation region R of the electron beam B. For example, the heaters 37a are induction heating-type heaters or resistance heating-type heaters. The heaters 37a generate heat upon operation. Further, the heaters 37a heat the irradiation region R through heat conduction. The heaters 37a are electrically connected to the control unit 4. The heaters 37a start operation in response to an operation signal of the control unit 4. In addition, the heaters 37a stop operation in response to an operation signal of the control unit 4. As illustrated in FIG. 1, the additive manufacturing device 1 has two heaters 37a. The number of heaters 37a included in the additive manufacturing device 1 may be one, two, or more. When scattering of the powder material A has occurred due to irradiation with the electron beam B, the heaters 37a start heating of the irradiation region R based on a state in which irradiation with the electron beam B has stopped. That is, when scattering of the powder material A has occurred due to irradiation with the electron beam B, the heaters 37a start heating of the irradiation region R triggered by the stop of irradiation with the electron beam B. In other words, the heaters 37a operate before a new powder material A is supplied to the irradiation region R in which scattering has occurred.

Figure 2:
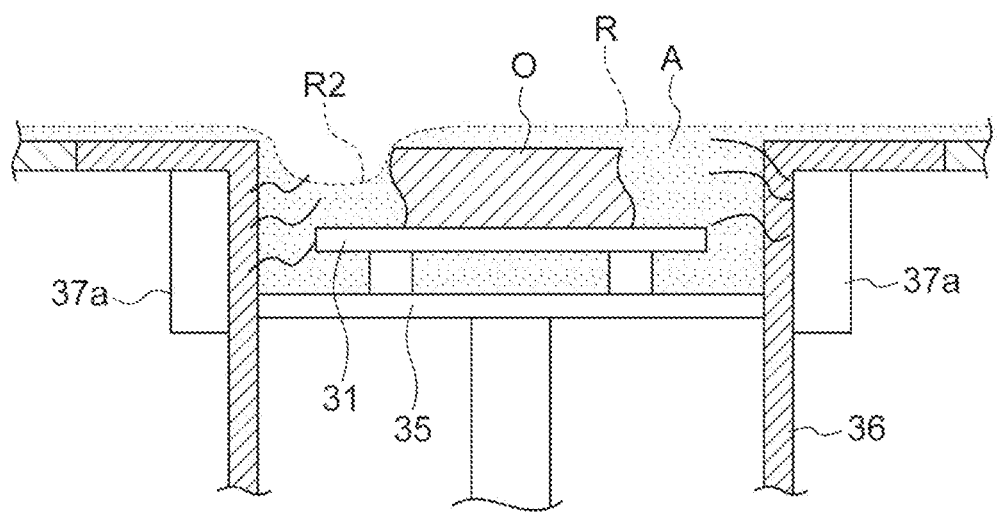
FIG. 2 is a view describing a heater included in the additive manufacturing device in FIG. 1.

As illustrated in FIG. 2, as a result of the heaters 37a which have started operation, heat emitted by the heaters 37a is conducted to the powder material A, the article O, and the plate 31 accommodated in the irradiation region R with the manufacturing tank 36 therebetween. That is, the powder bed of the irradiation region R is in a high-temperature state. According to this state, when the powder material A is heated, heat of the powder material A is unlikely to escape around thereof. As a result, when the powder material A is supplied to a region recessed due to scattering, it is easy for the supplied powder material A to be in a high-temperature state. A powder bed means a powder material A which has been laid and leveled. In addition, a powder bed may mean a part in which the article O and the plate 31 are exposed.

As illustrated in FIG. 1, the heaters 37b are provided in a ceiling portion of the chamber 30. The heaters 37b function as heating units for heating the irradiation region R of the electron beam B. For example, radiation heaters are used as the heaters 37b. Specifically, the heaters 37b are halogen lamp heaters. The heaters 37b are electrically connected to the control unit 4. The heaters 37b start operation in response to an operation signal of the control unit 4.

In addition, the heaters 37b stop operation in response to an operation signal of the control unit 4. The additive manufacturing device 1 illustrated in FIG. 1 includes two heaters 37b. The number of heaters 37b included in the additive manufacturing device 1 may be one, two, or more. When scattering of the powder material A has occurred due to irradiation with the electron beam B, the heaters 37b start heating of the irradiation region R based on the state in which irradiation with the electron beam B has stopped. That is, when scattering of the powder material A has occurred due to irradiation with the electron beam B, the heaters 37b start heating of the irradiation region R triggered by the stop of irradiation with the electron beam B. In other words, the heaters 37b start operation before a new powder material A is supplied to the irradiation region R in which scattering has occurred.

Figure 3:
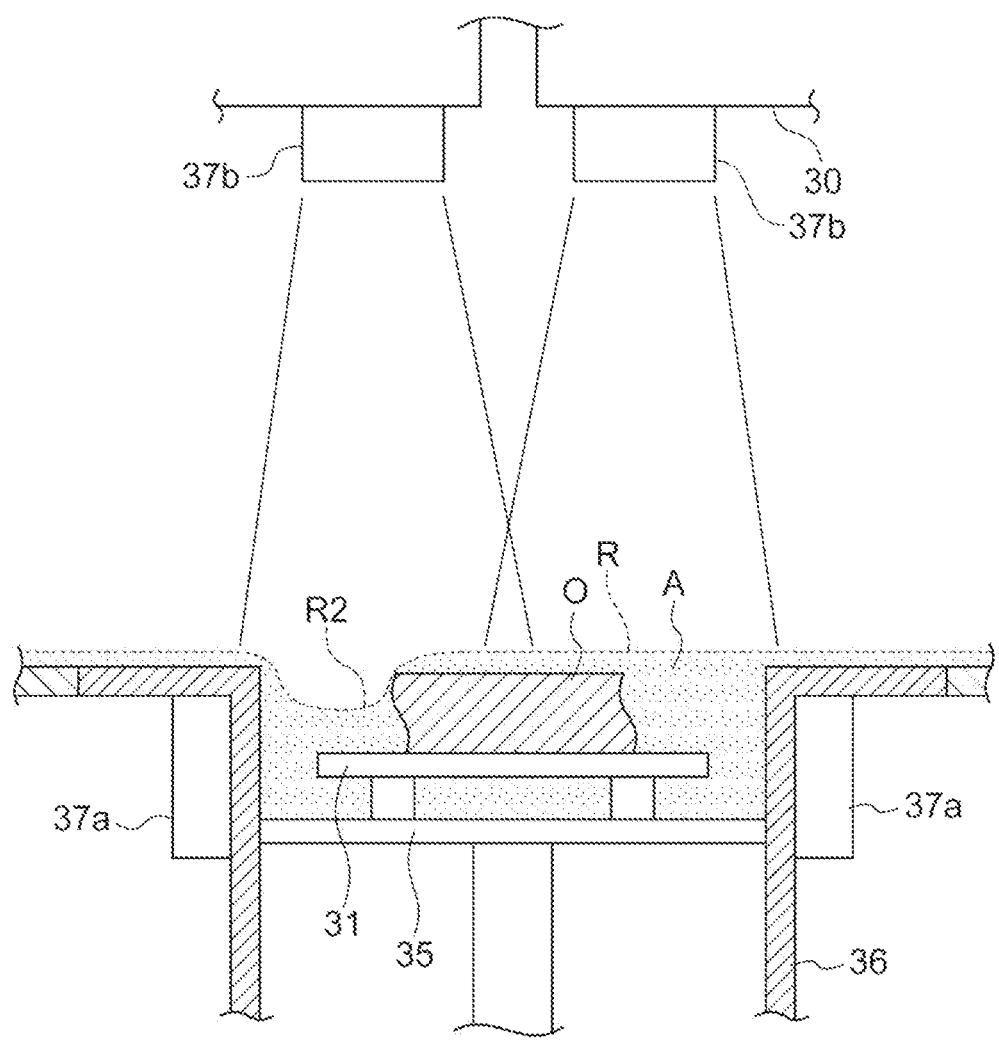
FIG. 3 is another view describing the heater included in the additive manufacturing device in FIG. 1.

As illustrated in FIG. 3, as a result of the heaters 37b which have started operation, the powder material A, the article O, and the like in the irradiation region R are heated due to radiation of heat of the heaters 37b. Therefore, the powder bed of the irradiation region R is in a high-temperature state. According to this state, when the powder material A is heated, heat of the powder material A is unlikely to escape around thereof. As a result, when the powder material A is supplied to a region recessed due to scattering, it is easy for the powder material A to be in a high-temperature state. The additive manufacturing device 1 may include any one of the heaters 37a and the heaters 37b. In addition, the heaters 37a and 37b need only be able to heat the irradiation region R of the electron beam B, and heating devices other than the heaters 37a and 37b may be used. For example, the irradiation region R may be heated through irradiation with the electron beam B.

As illustrated in FIG. 1, the temperature detector 38 is provided in the ceiling portion of the chamber 30. The temperature detector 38 detects the temperature of the irradiation region R of the electron beam B. For example, the temperature detector 38 is a radiation thermometer or a thermography device. The temperature detector 38 is electrically connected to the control unit 4. The temperature detector 38 inputs a detection signal to the control unit 4. Information of the detected temperature of the temperature detector 38 may be used for heating control of the heaters 37a and the heaters 37b.

The control unit 4 controls the additive manufacturing device 1 in its entirety. The control unit 4 is an electronic control unit. For example, the control unit 4 may be a computer including a CPU, a ROM, and a RAM. The control unit 4 performs elevating control of the plate 31, operation control of the powder supply mechanism 33, emission control of the electron beam B, operation control of the deflection coil 24, detection of scattering of the powder material A, and operation control of the heaters 37a and 37b. Regarding elevating control of the plate 31, the control unit 4 adjusts the vertical position of the plate 31. In elevating control, the control unit 4 outputs a control signal to the elevator 32 such that the elevator 32 operates. Regarding operation control of the powder supply mechanism 33, the control unit 4 supplies the powder material A to a part on the plate 31 and levels the supplied powder material A. In operation control of the powder supply mechanism 33, the control unit 4 causes the powder supply mechanism 33 to operate before the electron beam B is emitted. Regarding emission control of the electron beam B, the control unit 4 causes the electron gun portion 21 to emit the electron beam B. In emission control, the control unit 4 outputs a control signal to the electron gun portion 21.

Figure 5:
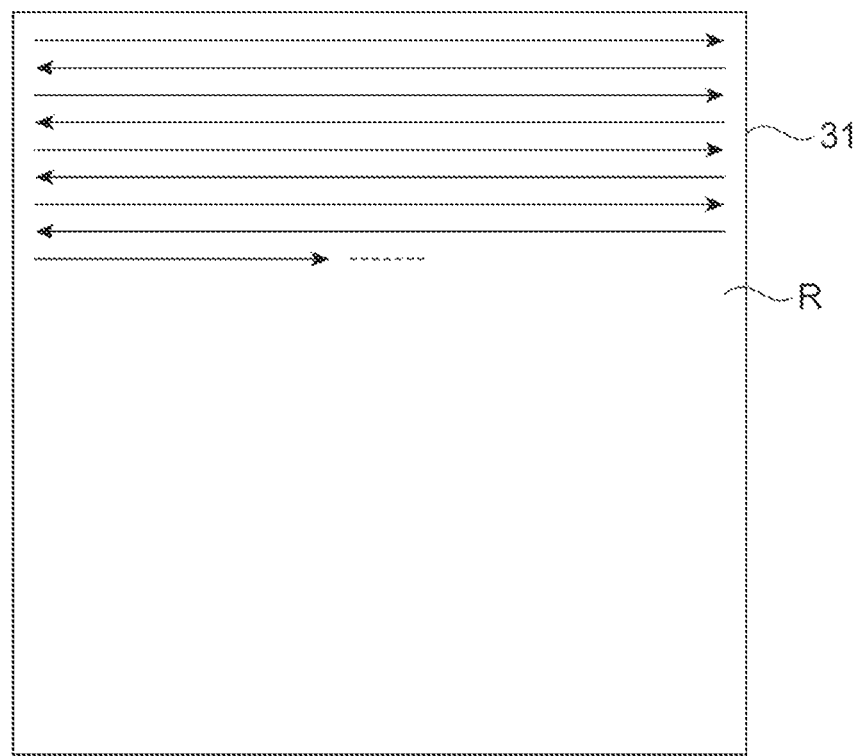
FIG. 5 is a view describing preliminary heating in the additive manufacturing device in FIG. 1 and the additive manufacturing method of the present disclosure.

Regarding operation control of the deflection coil 24, the control unit 4 controls the irradiation position of the electron beam B. In operation control of the deflection coil 24, the control unit 4 outputs a control signal to the deflection coil 24. For example, when preliminary heating of the powder material A is performed, the control unit 4 performs irradiation with the electron beam B for scanning the plate 31 with the electron beam B by outputting a control signal to the deflection coil 24 of the beam emitting unit 2. For example, as illustrated in FIG. 5, the control unit 4 performs irradiation with the electron beam B by moving the irradiation position of the electron beam B to reciprocate left and right such that the powder material A disposed on the entire surface of the irradiation region R on the plate 31 is heated evenly. Irradiation with the electron beam B for preliminary heating may be performed only once with respect to the entire surface of the plate 31. In addition, irradiation with the electron beam B for preliminary heating may be repetitively performed a plurality of times with respect to the entire surface of the irradiation region R. The powder material A is heated by performing preliminary heating. The heated powder material A is temporarily sintered, and therefore accumulation of negative electric charges due to irradiation with the electron beam B is reduced.

When the article O is manufactured, the control unit 4 uses three-dimensional computer-aided design (CAD) data of the article O to be manufactured, for example. The three-dimensional CAD data of the article O is data which is input in advance and indicates the shape of the article O. The control unit 4 or a computation device (not illustrated) generates two-dimensional slice data based on the three-dimensional CAD data. Slice data is an aggregate of a number of pieces of data. Each piece of the data included in the slice data indicates the shape of a horizontal cross-section of the article O to be manufactured, for example. In addition, each piece of the data corresponds to the vertical position in a direction perpendicular to the cross section. The control unit 4 decides a region in which the powder material A is irradiated with the electron beam B based on the slice data. The control unit 4 outputs a control signal to the deflection coil 24 in accordance with the decided region. As a result of the control unit 4 outputting a control signal to the deflection coil 24 of the beam emitting unit 2, the beam emitting unit 2 irradiates a manufacturing region corresponding to the cross-sectional shape of the article O with the electron beam B.

The control unit 4 detects whether or not scattering of the powder material A has occurred. The control unit 4 functions as a detection unit for detecting whether or not scattering of the powder material A has occurred when the powder material A is irradiated with the electron beam B. Scattering of the powder material A means a smoke phenomenon of the powder material A described above. The presence or absence of scattering of the powder material A means the presence or absence of occurrence of a smoke phenomenon. The control unit 4 detects the presence or absence of scattering of the powder material A based on a detection signal of the scattering detector 25. When a detection signal of the scattering detector 25 includes a signal component indicating occurrence of scattering, the control unit 4 recognizes that scattering of the powder material A has occurred. In addition, the control unit 4 stores information indicating occurrence of scattering of the powder material A.

Next, operation of the additive manufacturing device 1 and the additive manufacturing method of the present disclosure will be described.

Figure 4:
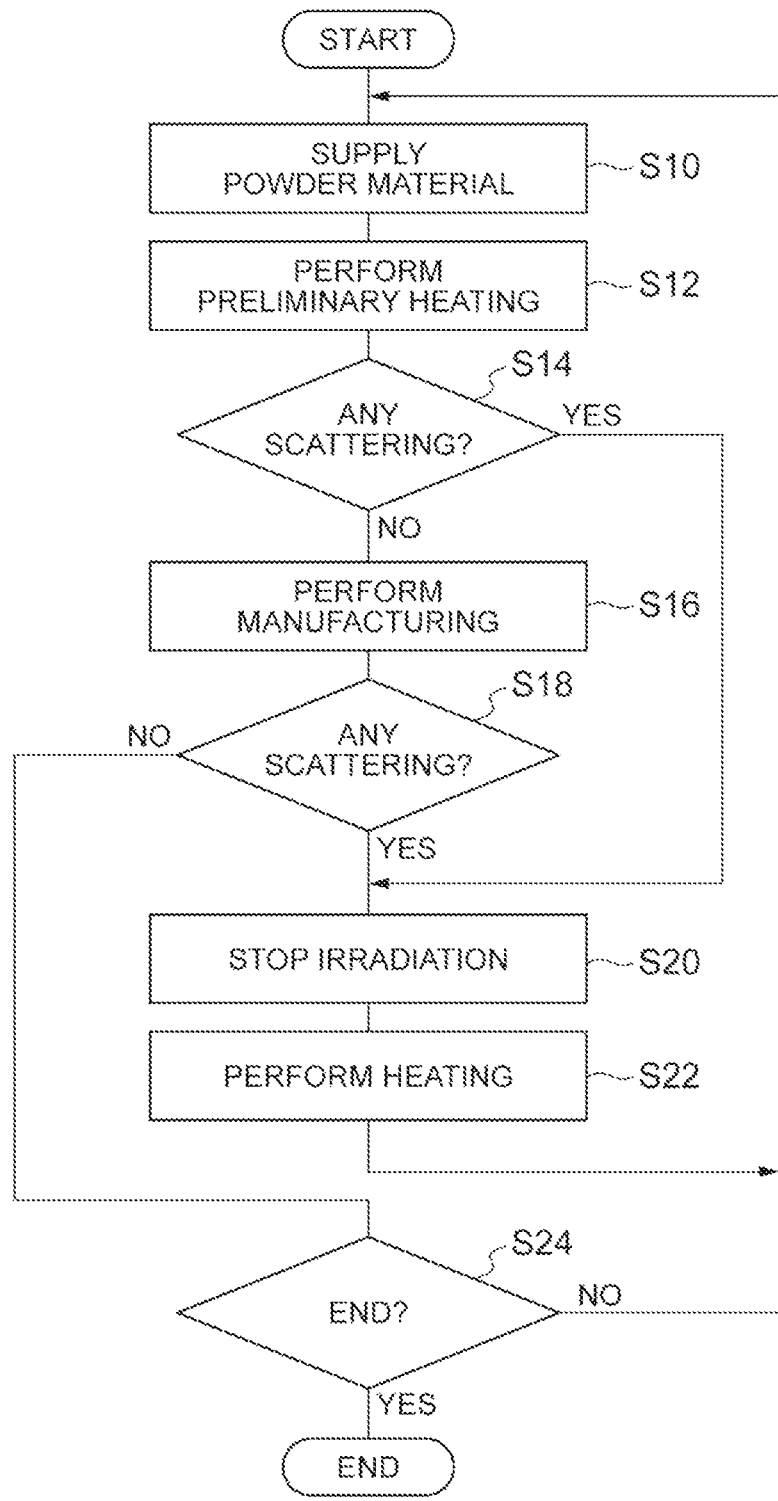
FIG. 4 is a flowchart showing operation of the additive manufacturing device and an additive manufacturing method of the present disclosure.

FIG. 4 is a flowchart showing operation of the additive manufacturing device 1 and the additive manufacturing method of the present disclosure. For example, a series of control processing in FIG. 4 is performed by the control unit 4. In operation of the additive manufacturing device 1 and the additive manufacturing method of the present disclosure, preliminary heating of the powder material A and manufacturing of the article O are repeated alternately by irradiating the powder material A with the electron beam B. As a result, in operation of the additive manufacturing device 1 and the additive manufacturing method of the present disclosure, the article O is manufactured into a laminated shape. When the powder material A has scattered due to irradiation of the powder material A with the electron beam B, irradiation with the electron beam B is stopped. Thereafter, the irradiation region R of the electron beam B is heated. Further, a new powder material A is supplied to the heated irradiation region R. Next, irradiation with the electron beam B is restarted. Hereinafter, with reference to FIG. 4, operation of the additive manufacturing device 1 and the additive manufacturing method of the present disclosure will be described specifically.

As shown in Step S10 of FIG. 4, the powder material A is supplied. In the following description, Step S10 will be simply indicated as "S10". The same applies to each of the steps after S10. The processing of supplying the powder material A includes processing of supplying the powder material A to the irradiation region R of the electron beam B and processing of leveling the surface of the supplied powder material A. For example, as illustrated in FIG. 1, the control unit 4 adjusts the vertical position of the plate 31 by outputting a control signal to the elevator 32. In addition, the control unit 4 causes the powder supply mechanism 33 to operate by outputting a control signal to an actuator or a mechanism (not illustrated). Due to operation thereof, the powder supply mechanism 33 operates in the horizontal direction. As a result, the powder material A is supplied to a region above the plate 31, and the surface of the powder material A is leveled.

The processing shifts to S12 in FIG. 4. In S12, processing of preliminary heating is performed. In the processing of preliminary heating, the powder material A is heated in advance before manufacturing of an article is performed. Preliminary heating of the powder material A is performed through irradiation with the electron beam B. The control unit 4 causes the electron gun portion 21 to emit the electron beam B by outputting a control signal to the beam emitting unit 2. In addition, the control unit 4 performs scanning with the electron beam B by outputting a control signal to the beam emitting unit 2. Irradiated with the electron beam B is performed with respect to the entire surface of the irradiation region R. In other words, irradiation with the electron beam B is performed with respect to the powder material A on the plate 31. As illustrated in FIG. 5, irradiation with the electron beam B is performed by moving the irradiation position of the electron beam B to reciprocate left and right such that the powder material A disposed on the entire surface of the irradiation region R on the plate 31 is heated evenly. In this case, irradiation with the electron beam B may be performed repetitively with respect to the irradiation region R. FIG. 5 is a view of the plate 31 viewed from above. In FIG. 5, for the sake of convenience of description, only the plate 31 is illustrated. That is, in FIG. 5, illustration of the powder material A is omitted.

Figure 6:
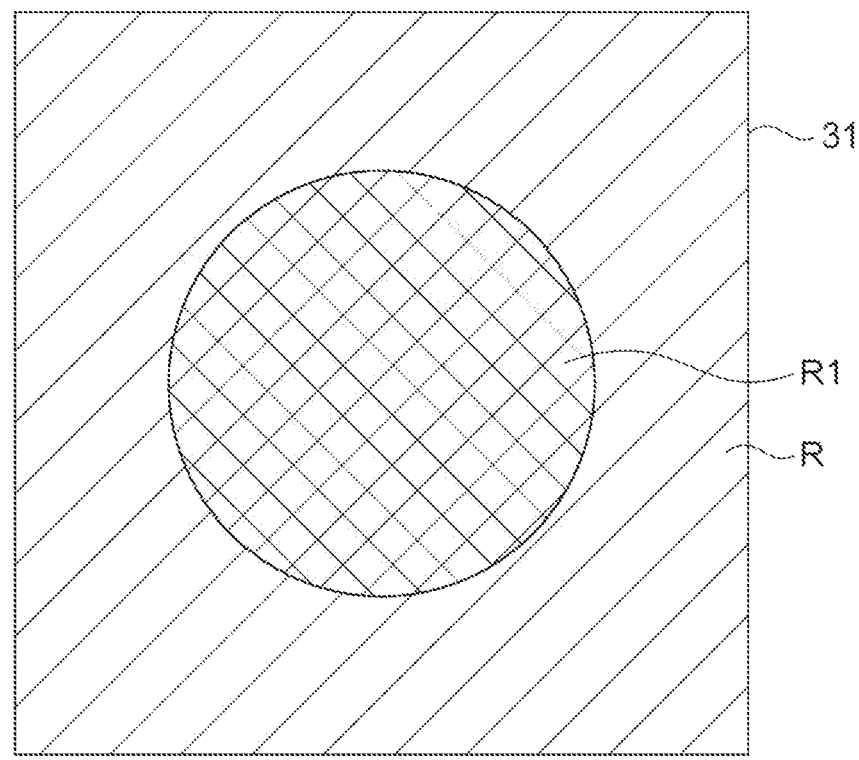
FIG. 6 is another view describing preliminary heating in the additive manufacturing device in FIG. 1 and the additive manufacturing method of the present disclosure.

Irradiation with the electron beam B for preliminary heating may be performed with respect to the irradiation region R and the manufacturing region R1. For example, first, as illustrated in FIG. 5, irradiation with the electron beam B is performed with respect to the entire surface of the irradiation region R. Next, as illustrated in FIG. 6, irradiation with the electron beam B is performed with respect to the manufacturing region R1 of the article O. Irradiation with the electron beam B may be repeated a plurality of times with respect to the irradiation region R. Similarly, irradiation with the electron beam B may be repeated a plurality of times with respect to the manufacturing region R1. The range of the manufacturing region R1 is narrower than the range of the irradiation region R. The manufacturing region R1 is a region in which the article O is manufactured. In this case, the manufacturing region R1 may be a region in which the article O is manufactured. In addition, the manufacturing region R1 may be a region approximately the same as the region in which the article O is manufactured. In this manner, preliminary heating is performed with respect to the entire irradiation region R by performing irradiation with the electron beam B with respect to the irradiation region R and the manufacturing region R1. As a result, the irradiation region R can be in a high-temperature state. In addition, occurrence of scattering of the powder material A can be curbed effectively by increasing the heating amount of preliminary heating with respect to the manufacturing region R1. In addition, compared to a case in which the entire irradiation region R is subjected to preliminary heating repetitively, an influence of heat on the powder material A can also be alleviated. The powder material A receives an influence of heat caused by heating. An influence of heat on the powder material A includes oxidation, deformation, and a change in chemical composition. Moreover, there is also concern that a change in mechanical characteristics may occur in the powder material A due to the change described above. Therefore, a region for irradiation with the electron beam B may be minimum necessary. Therefore, a part of the irradiation region for preliminary heating is limited to the manufacturing region R1. As a result, an influence of heat on the powder material A can be reduced. Therefore, the powder material A can also be reutilized.

The processing shifts to S14. In S14, it is determined whether or not the powder material A has scattered. In determination processing, it is determined whether or not the powder material A has scattered due to irradiation with the electron beam B during the processing of preliminary heating in S12. For example, the control unit 4 causes the scattering detector 25 to operate as the additive manufacturing device 1 starts operation. As a result, the control unit 4 detects scattering of the powder material A based on a detection signal of the scattering detector 25. Scattering may be detected while the processing of supplying the powder material A in S10 is executed. However, in S10, the powder material A is not irradiated with the electron beam B. Therefore, during the determination processing in S10, occurrence of scattering of the powder material A is not detected. For example, as described above, scattering of the powder material A is detected based on whether or not the number of instances of detection per unit time added every time X-rays are detected has exceeded a predetermined threshold. In S14, when the number of instances of detection per unit time of X-rays exceeds the threshold, it is determined that the powder material A has scattered. When the number of instances of detection per unit time of X-rays does not exceed the threshold, it is determined that the powder material A has not scattered. When there is no possibility that scattering of the powder material A occurs during the processing of preliminary heating or when the possibility is extremely low, the determination processing in S14 may be omitted. When it is determined in S14 that scattering of the powder material A has occurred, the processing shifts to S20. On the other hand, when it is determined in S14 that scattering of the powder material A has not occurred, manufacturing processing is performed (S16). In the manufacturing processing, an article is manufactured. For example, the control unit 4 generates two-dimensional slice data based on the three-dimensional CAD data of an article to be manufactured. Further, the control unit 4 decides a region in which the powder material A is irradiated with the electron beam B based on this slice data. The control unit 4 causes the beam emitting unit 2 to perform irradiation with the electron beam B such that the decided region is irradiated with the electron beam B. In the manufacturing processing, one layer constituting the article O is manufactured.

The processing shifts to S18. In S18, it is determined whether or not scattering of the powder material A has occurred. In the determination processing, it is determined whether or not scattering of the powder material A has occurred due to irradiation with the electron beam B during the manufacturing processing in S16. The determination processing in S18 is similar to the determination processing in S14 described above. When it is determined in S18 that scattering of the powder material A has not occurred, the processing shifts to S24. On the other hand, when it is determined in S18 that scattering of the powder material A has occurred, the processing shifts to S20.

In S20, irradiation stopping processing is performed. In the irradiation stopping processing, irradiation with the electron beam B is stopped. Irradiation with the electron beam B is stopped by performing the irradiation stopping processing. As a result, manufacturing of the article O is interrupted. The control unit 4 stops outputting of a control signal which has been output to the beam emitting unit 2. As a result, the electron gun portion 21 stops emission of the electron beam B. Therefore, irradiation with the electron beam B is stopped.

The processing shifts to S22. In S22, heating processing of the irradiation region R is performed. In the heating processing of the irradiation region R, the irradiation region R in which scattering of the powder material A has occurred is heated. The control unit 4 causes the heaters 37a and the heaters 37b to operate by outputting an operation signal to the heaters 37a and the heaters 37b. As a result, as illustrated in FIG. 2, the heaters 37a generate heat. Heat of the heaters 37a is conducted to the powder material A, the article O, and the like in the irradiation region R with the manufacturing tank 36 therebetween. Therefore, the powder bed of the irradiation region R is heated. In addition, as illustrated in FIG. 3, the powder beds of the powder material A, the article O, and the like in the irradiation region R are heated due to radiation of heat of the heaters 37b.

In parallel with S22, as illustrated in FIG. 1, the temperature of the irradiation region R may be detected by the temperature detector 38. Suitable heating processing of the irradiation region R can be performed by controlling operation of the heaters 37a and the heaters 37b such that the temperature of the irradiation region R reaches a target temperature.

After the heating processing in S22 has ended, S10 is performed again. That is, when scattering of the powder material A has occurred, the irradiation region R in which scattering has occurred is heated, the powder material A is supplied thereafter, and manufacturing of the article O is restarted finally.

Incidentally, when it is determined in S18 that scattering of the powder material A has not occurred, it is determined whether or not conditions for ending the control processing are established (S24). A case in which conditions for ending the control processing are established denotes a case in which manufacturing of a desired additively manufactured article has ended, for example. That is, the foregoing case is a case in which manufacturing of the article O is completed as a result of the control processing of S10 to S22 performed repetitively. On the other hand, a case in which the conditions for ending the control processing are not established denotes a case in which manufacturing of a desired additively manufactured article O has not been completed, for example.

When it is determined in S24 that the conditions for ending the control processing are not established, S10 is performed again. On the other hand, when it is determined in S24 that the conditions for ending the control processing are established, a series of control processing in FIG. 4 ends.

As the processing of S10 to S24 shown in FIG. 4 is performed repetitively, the article O is gradually formed into a layer shape. As a result, a desired article O is manufactured finally.

As described above, in the additive manufacturing device 1 and the additive manufacturing method of the present disclosure, when the powder material A has scattered due to irradiation with the electron beam B during manufacturing of the article O, the irradiation region R is heated before the powder material A is supplied to the irradiation region R. Next, in the additive manufacturing device 1 and the additive manufacturing method of the present disclosure, the powder material A is supplied to the heated irradiation region R. Further, in the additive manufacturing device 1 and the additive manufacturing method of the present disclosure, manufacturing of the article O is restarted. As a result, when the powder material A is supplied to the irradiation region R in order to restart manufacturing, the powder bed of the irradiation region R is at a high temperature. Therefore, when the powder material A supplied to the heated irradiation region R is irradiated with the electron beam B, heat of the powder material A is unlikely to escape. As a result, it is easy for the powder material A to be at a high temperature. Therefore, a recurrence of scattering of the powder material A can be curbed.

Figure 7:
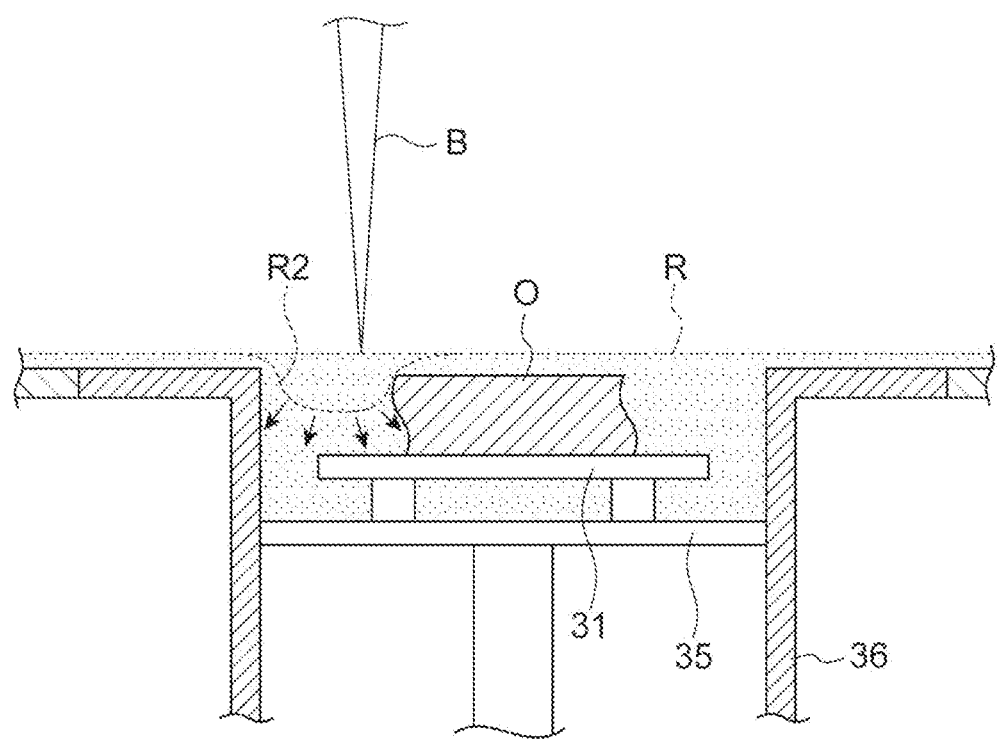
FIG. 7 is a view describing an additive manufacturing device and an additive manufacturing method in a comparative example.

For example, as illustrated in FIG. 7, when the powder material A has scattered due to irradiation with the electron beam B, and when the powder material A is supplied to the non-heated irradiation region R, a scattering region R2 is not at a high temperature. Furthermore, a newly supplied powder material A is at a normal temperature. At this time, while a large amount of new powder material A is supplied to the scattering region R2, the temperature of the powder bed in the scattering region R2 drops. Therefore, when a large amount of powder scatters, the temperatures of the scattering region R2 and the supplied powder material A become lower than those at the time of normal manufacturing. In such circumstances, if a newly supplied powder material A is irradiated with the electron beam B, heat of the powder material A is conducted downward, and therefore heat of the powder material A is dissipated. Therefore, temporary sintering of the powder material A becomes insufficient. As a result, there is concern that scattering of the powder material A may recur. In contrast, in the additive manufacturing device 1 and the additive manufacturing method of the present disclosure, when the powder material A has scattered due to irradiation with the electron beam B, the irradiation region R is heated before the powder material A is supplied to the irradiation region R. Further, in the additive manufacturing device 1 and the additive manufacturing method of the present disclosure, manufacturing of the article O is restarted after the powder material A is supplied to the heated irradiation region R. Therefore, when the newly supplied powder material A is irradiated with the electron beam B, heat of the powder material A is unlikely to escape around thereof. Therefore, temporary sintering of the powder material A can be performed sufficiently. As a result, a recurrence of scattering of the powder material A can be curbed.

According to the additive manufacturing device 1 and the additive manufacturing method of the present disclosure, a recurrence of scattering of the powder material A during manufacturing of the article O can be curbed. As a result, damage and malfunction of the additive manufacturing device 1 can be curbed. For example, if scattering of the powder material A occurs frequently, the number of instances in which the powder material A is blown upward to the electron gun portion 21 increases. The powder material A which has been blown upward adheres to the electron gun portion 21. As a result of adhering, corruption and damage of the electron gun portion 21 occur. Therefore, the additive manufacturing device 1 causes malfunction. In contrast, in the additive manufacturing device 1 and the additive manufacturing method of the present disclosure, the number of instances of occurrence of scattering of the powder material A can be reduced. As a result, corruption, damage, and malfunction of the additive manufacturing device 1 can be curbed.

In the additive manufacturing device 1 and the additive manufacturing method of the present disclosure, when the powder material A scatters, the irradiation region R is heated using the heaters 37a and 37b which heat the irradiation region R through conduction or radiation of heat. At this time, when heating is performed through irradiation with the electron beam B, there is concern that smoke may be generated further and local heat concentration may occur due to local concentration of electric charges. Therefore, there is concern that the powder material A may be sintered or the like. Here, regarding heating when the powder material A has scattered, a heater which performs heating through conduction or radiation of heat is used in place of irradiation of an electron beam. As a result, it is possible to reduce concern that the powder material A may be sintered due to local concentration of electric charges. In addition, in irradiation with the electron beam B, electric charges and local concentration of the quantity of heat may be restrained by intentionally moderating the convergent state of the electron beam B. As a result, the foregoing concern can be reduced, and a temperature rise in the powder bed can be achieved.

In the additive manufacturing device 1 and the additive manufacturing method of the present disclosure, when occurrence of scattering of the powder material A is detected during manufacturing of the article O, heating of the irradiation region R is started based on the state in which irradiation with the electron beam B has stopped. Therefore, excessive heating with respect to the irradiation region R is curbed. As a result, an influence of heat received by the powder material A can be reduced.

When the irradiation region R is heated using the heaters 37a and 37b which perform heating through conduction or radiation of heat, irradiation with the electron beam B is stopped triggered by the start of heating of the irradiation region R. As a result, excessive heating of the irradiation region R is curbed. A heater for heating the powder material A through conduction or radiation of heat may be operated when irradiation is performed with the electron beam B. However, if the heater is operated continuously, the powder material A is heated excessively. As a result, there is a possibility that the powder material A is sintered completely. If sintering of the powder material A occurs, there are cases in which mechanical working is required when a finished article O is taken out. In addition, if sintering of the powder material A occurs, there is also a possibility that a sintered body cannot be reutilized as a powder material because the sintered body is crushed after manufacturing. Here, in the additive manufacturing device 1 and the additive manufacturing method of the present disclosure, when scattering of the powder material A is detected during manufacturing of the article O, heating of the irradiation region R is started based on the state in which irradiation with the electron beam B has stopped. As a result, excessive heating of the powder material A is curbed, and therefore sintering can be curbed.

In the additive manufacturing device 1 and the additive manufacturing method of the present disclosure, when scattering of the powder material A is detected during manufacturing of the article O, heating is started by the heater after irradiation with the electron beam B is stopped. In other words, heating by the heater is not performed during irradiation with the electron beam B. Therefore, the trajectory of the electron beam B can be prevented from deviating due to an electric field generated through operation of the heater.

Here, effects obtained through the preliminary heating (S12) performed when the powder material A has scattered and when manufacturing is restarted will be described. In other words, effects obtained through the preliminary heating (S12) performed after it is determined to be YES in S14 and S18 and after heating (S22) and powder supplying (S10) performed successively to the heating (S22) will be described. In the following description, each of the effects in a case in which a charged particle beam is used for the preliminary heating (S12) and the effects in a case in which a different means other than a charged particle beam is used for the preliminary heating (S12) will be described.

When a charged particle beam is used for the preliminary heating (S12), the irradiation region R is heated through the heating processing S22, so that heat of the powder material A is unlikely to escape when a new powder material A is irradiated with the charged particle beam for preliminary heating. As a result, it is easy for the powder material A to be in a high-temperature state during the preliminary heating (S12). Therefore, the powder material A can be heated sufficiently, and thus a recurrence of scattering the powder material A can be curbed in the preliminary heating (S12) when manufacturing is restarted. Moreover, as a result of the powder material A which is heated sufficiently in the preliminary heating (S12), temporary sintering is performed sufficiently. In this case, occurrence of scattering of the powder material A in primary melting (manufacturing processing S16) after the preliminary heating (S12) can also be curbed.

When a charged particle beam is not used for the preliminary heating (S12), that is, when a heat source such as a heater is used for the preliminary heating (S12), there is no concern for scattering of the powder material A has occurred due to irradiation with the charged particle beam. Regarding a heater or the like, for example, the heaters 37a, 37b, and 37c (heating units) may be utilized. However, if a charged particle beam is used for the primary melting (manufacturing processing S16) after preliminary heating, there is concern that scattering of a powder due to irradiation with the charged particle beam may occur. Therefore, even when a charged particle beam is not used for the preliminary heating (S12), it is desirable that temporary sintering be performed sufficiently at the time of preliminary heating.

In short, according to the aspect of the present disclosure, when the powder material A scatters, the powder material A is supplied after the irradiation region R is heated, that is, after the heating processing (S22). As a result, heat of the powder material A is unlikely to escape when the preliminary heating (S12) is performed. As a result, it is easy for the powder material A to be in a high-temperature state. Therefore, temporary sintering is performed sufficiently through the preliminary heating (S12). As a result, scattering in the primary melting can be curbed.

The additive manufacturing device and the additive manufacturing method of the present disclosure are not limited to the embodiment described above. The additive manufacturing device and the additive manufacturing method of the present disclosure can adopt various deformation forms within a range not departing from the gist disclosed in the claims.

Figure 8:
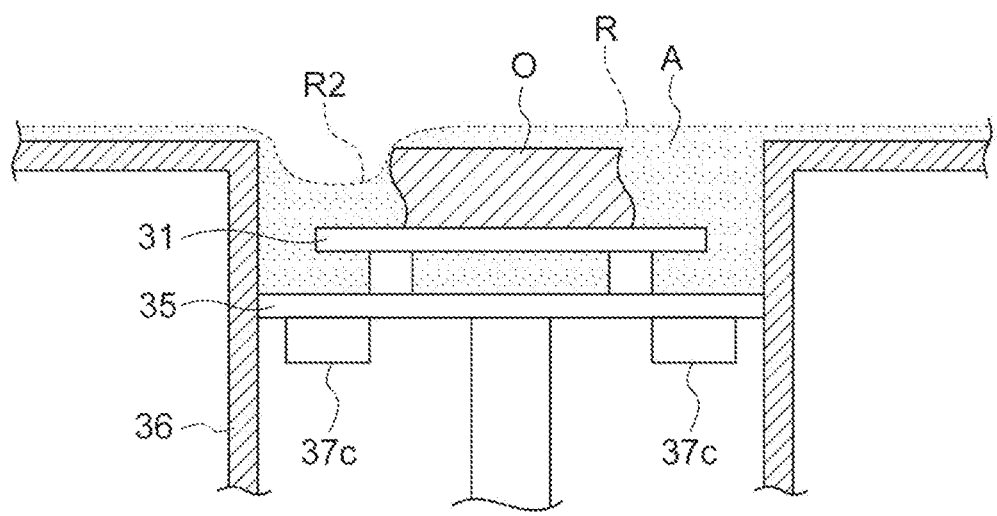
FIG. 8 is a view describing a modification example of the additive manufacturing device in FIG. 1 and the additive manufacturing method of the present disclosure.

For example, in the additive manufacturing device and the additive manufacturing method of the present disclosure, the heaters 37a are attached to the manufacturing tank 36. The heaters 37a may be attached to different positions as long as the irradiation region R can be heated at the positions. Specifically, as illustrated in FIG. 8, the heater 37c may be attached to a lower surface of the elevating stage 35. As the heater 37c generates heat, the heat of the heater 37c is conducted to the powder material A in the irradiation region R with the elevating stage 35 and the plate 31 therebetween. As a result, the heater 37c can heat the powder bed of the irradiation region R. Therefore, the same action and the same effects as the additive manufacturing device 1 and the additive manufacturing method of the present disclosure described above can be achieved.

In the additive manufacturing device and the additive manufacturing method of the present disclosure described above, the electron beam B is illustrated as an example of a charged particle beam, and a case in which an article is manufactured using the electron beam B has been described. In manufacturing of an article, a charged particle beam of a kind other than the electron beam B may be used. For example, an article may be manufactured using an ion beam as a charged particle beam.

Figure 9:
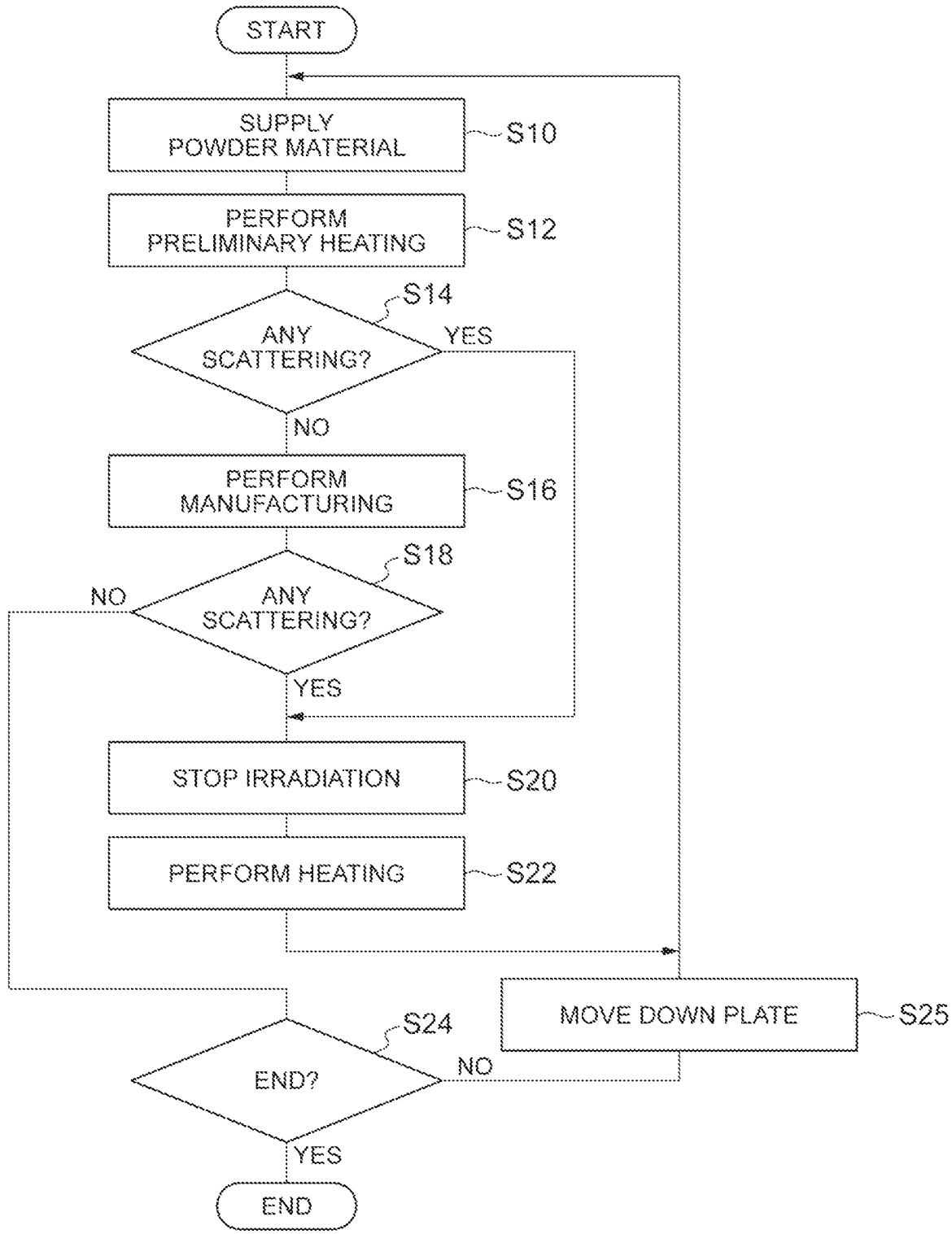
FIG. 9 is a flowchart showing the modification example of the additive manufacturing method of the present disclosure.

For example, as shown in the flowchart of FIG. 9, the additive manufacturing method may have a step (S25) moving down the plate 31. The control unit 4 causes the elevator 32 to operate by outputting a control signal to the elevator 32. Due to operation of the elevator 32, the plate 31 moves down with the elevating stage 35 therebetween. For example, the length of this downward movement may be the same as the thickness of one manufactured layer. S25 is performed when the result of determination in S24 is NO. That is, S25 is performed when at least the manufacturing (S16) is performed and when the result of determination in determination (S18) of scattering is NO thereafter. In other words, S25 is performed when manufacturing is performed, and occurrence of scattering is not detected. For example, when occurrence of scattering is detected in S14 and S18, operation (S25) of moving down the plate 31 is not performed.

For example, as shown in the flowchart of FIG. 10, the additive manufacturing method described above may further have a post-heating processing (S26) and a scattering detection processing (S27). The term "post-heating" is used as an antonym of "preheating". The "post-heating" is heat processing for heating a manufactured article and/or the powder material A after the manufacturing (S16). S26 is performed when the result of determination in S18 is NO. That is, S26 is performed when the manufacturing (S16) is performed and occurrence of scattering is not detected through the manufacturing. This post-heating may be heating by a heater or the like as long as the heating can apply a necessary quantity of heat. However, when the powder material A is heated using a charged particle beam similar to preheating and manufacturing, there is a possibility that occurrence of scattering is also caused in the post-heating processing. Here, when post-heating is performed using a charged particle beam, processing of detecting scattering (S27) is performed subsequently to S26. When occurrence of scattering is not detected (S27: NO), the processing shifts to S24. When occurrence of scattering is detected (S27: YES), the processing shifts to S25. Irradiation stopping (S27a) and heating (S27b) may be performed after S27 and before S25. The irradiation stopping (S27a) may be processing similar to the foregoing irradiation stopping (S20). The heating (S27b) may be processing similar to the foregoing heating (S20). The processing S27a and the processing S27b need only be performed before supplying of the powder material (S10), and therefore it may be performed after the moving-down of the plate (S25) and before supplying of the powder material (S10). That is, S27a and S27b may be performed between steps from S27: YES to S10, regardless whether before or after the moving-down of the plate (S25). When the post-heating processing (S26) is performed, operation of moving down the plate 31 (S25) may be performed even when a result of detection of scattering (S27) is YES or NO.

For example, the additive manufacturing method described above may further have processing (not illustrated) of detecting a powder applying state. The detection processing may be performed after S10 and before S12. The degree of scattering of a powder is affected by the charged state of the powder bed. That is, there is a possibility that the entire region recessed due to scattering may not be filled with an amount of a powder supplied in order to lay a powder for one normal layer. In addition, when the recessed region is not filled sufficiently through scattering, absence of the powder material A may be caused at the focus position of the electron beam B. Accordingly, the state of the powder bed after the powder material A is supplied may be checked using a powder bed observation device (not illustrated). Further, when it is determined that filling is insufficient as a result of the check, the powder supply mechanism 33 is operated again and the powder material A is added.

The powder bed observation device need only have a function capable of determining whether or not the scattering region R2 is filled, a device which can conduct the function, an image capturing device, or a device corresponding thereto may be employed. For example, the powder bed observation device has a powder collection mechanism (not illustrated) provided between (upper surface of) the manufacturing tank 36 and the discharging port 34a of the powder material A. When the powder supply mechanism 33 is moved horizontally to supply the powder material A to a part on the plate 31 (on the powder bed), and when a surplus powder which does not fit in the manufacturing tank 36 is generated, (all or some of) the surplus powder is collected by the powder collection mechanism. Further, the powder bed observation device may determine whether or not the scattering region R2 is filled based on the collection amount, that is, may determine whether or not the powder bed is leveled. In addition, it may be determined whether or not the scattering region R2 is filled by capturing an image of the powder bed with a camera and performing image processing of the camera image. In addition, if a recess in the powder bed is irradiated with the electron beam B, the trajectory of the electron beam B is distorted. It may be determined whether or not the scattering region R2 is filled utilizing this phenomenon based on the trajectory of the electron beam B in the preheating processing. In this configuration, when it is found that a recess is present due to the trajectory of the electron beam B in the preheating processing, supplying of the powder material A (S10) may be performed again without shifting to irradiation with the electron beam B (S16) for the manufacturing processing.

REFERENCE SIGNS LIST 1 additive manufacturing device
2 Beam emitting unit
3 Manufacturing unit
4 Control unit (detection unit)
21 Electron gun portion
22 Aberration coil
23 Focus coil
24 Deflection coil
25 Scattering detector
31 Plate
32 Elevator
33 Powder supply mechanism
34 Hopper
37a Heater (heating unit)
37b Heater (heating unit)
37c Heater (heating unit)
A Powder material
B Electron beam
R Irradiation region
R1 Manufacturing region
R2 Scattering region

The invention claimed is:

1. An additive manufacturing device performing manufacturing of an additively manufactured article by supplying a powder material to an irradiation region of a charged particle beam, laying and leveling the powder material, irradiating the powder material with the charged particle beam, and melting the powder material, the additive manufacturing device comprising:
    a beam emitting unit emitting the charged particle beam and irradiating the powder material with the charged particle beam;
    a scattering detection unit detecting that the powder material has scattered by irradiating the powder material with the charged particle beam;
    a heating unit heating the irradiation region; and
    a powder supply unit supplying the powder material to the irradiation region of the charged particle beam; and
    a controller determining whether or not scattering of the powder material has occurred based on a detection signal from the scattering detection unit, and outputting at least one control signal to the beam emitting unit, the heating unit, and the powder supply unit, wherein
    the controller is configured to cause
        in response to receiving the detection signal from the scattering detection unit, an operation to determine whether the powder material has scattered based on the detection signal,
        on a condition that the controller detects that the scattering of the powder material has occurred, an operation to stop an irradiation of the charged particle beam by outputting the at least one control signal to the beam emitting unit is performed,
        after the operation to stop the irradiation of the charged particle beam, an operation to heat the irradiation region, at which the scattering of the powder material has occurred, by outputting the at least one control signal to the heating unit, and
        after the operation to heat the irradiation region, an operation to supply a new powder material to the irradiation region of the charged particle beam and leveling out a surface of the new powder material by outputting the at least one control signal to the powder supply unit.

2. The additive manufacturing device according to claim 1,
wherein the heating unit is a heater for heating the irradiation region through conduction or radiation of heat.

3. The additive manufacturing device according to claim 2,
wherein when scattering of the powder material is detected by the scattering detection unit during manufacturing of the additively manufactured article, the heating unit starts heating of the irradiation region based on a state in which irradiation with the charged particle beam has stopped.

* * * * *